US008387134B2

(12) United States Patent
Matsuoka et al.

(10) Patent No.: US 8,387,134 B2
(45) Date of Patent: Feb. 26, 2013

(54) INFORMATION PROCESSING APPARATUS AND METHOD OF CONTROLLING AUTHENTICATION PROCESS

(75) Inventors: Yoshio Matsuoka, Ome (JP); Mayumi Maeda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1356 days.

(21) Appl. No.: 11/507,444

(22) Filed: Aug. 22, 2006

(65) Prior Publication Data

US 2007/0050633 A1    Mar. 1, 2007

(30) Foreign Application Priority Data

Aug. 23, 2005 (JP) .................................. 2005-241218

(51) Int. Cl.
    *G06F 21/00* (2006.01)
(52) U.S. Cl. .......................................... 726/18; 713/183
(58) Field of Classification Search ............... 726/18; 713/183
    See application file for complete search history.

(56) References Cited

U.S. PATENT DOCUMENTS

| 4,992,783 | A  | * | 2/1991  | Zdunek et al. ............ 340/5.74 |
| 5,115,508 | A  | * | 5/1992  | Hatta ........................ 340/5.22 |
| 5,606,663 | A  | * | 2/1997  | Kadooka ....................... 726/18 |
| 5,892,906 | A  | * | 4/1999  | Chou et al. ................... 726/19 |
| 6,012,146 | A  | * | 1/2000  | Liebenow ...................... 726/17 |
| 6,397,337 | B1 | * | 5/2002  | Garrett et al. ................. 726/19 |
| 6,473,503 | B1 | * | 10/2002 | Karau et al. ............. 379/221.13 |
| 6,647,498 | B1 | * | 11/2003 | Cho ................................ 726/17 |
| 6,668,323 | B1 | * | 12/2003 | Challener et al. ............ 713/183 |
| 6,725,382 | B1 | * | 4/2004  | Thompson et al. ............. 726/19 |
| 6,904,370 | B1 | * | 6/2005  | Levinson et al. .............. 702/19 |
| 7,210,166 | B2 | * | 4/2007  | Davis et al. ...................... 726/6 |
| 2002/0099631 | A1 | * | 7/2002 | Vanker et al. ................... 705/28 |
| 2003/0070102 | A1 | * | 4/2003 | Kondo .......................... 713/202 |
| 2005/0182945 | A1 | * | 8/2005 | Ali et al. ....................... 713/182 |
| 2006/0085845 | A1 | * | 4/2006 | Davis et al. ...................... 726/6 |
| 2006/0139682 | A1 | * | 6/2006 | Ohira ........................... 358/1.14 |
| 2006/0230283 | A1 | * | 10/2006 | McBride et al. ............. 713/184 |
| 2007/0005951 | A1 | * | 1/2007 | Davis et al. ..................... 713/2 |
| 2008/0015958 | A1 | * | 1/2008 | Vanker et al. ................... 705/28 |

FOREIGN PATENT DOCUMENTS

| JP | 2001-27911   | 1/2001  |
| JP | 2002-268767  | 9/2002  |
| JP | 2002-334017  | 11/2002 |
| JP | 2004-234331  | 8/2004  |
| JP | 2004-310372  | 11/2004 |

(Continued)

OTHER PUBLICATIONS

Notification of Reasons for Rejection mailed Nov. 6, 2007 from the Japanese Patent Office for Japanese Patent Application No. 2005-241218.

*Primary Examiner* — Michael Pyzocha
(74) *Attorney, Agent, or Firm* — Finnegan, Henderson, Farabow, Garrett & Dunner, L.L.P.

(57) ABSTRACT

According to one embodiment, an information processing apparatus includes a main body, an authentication unit which performs an authentication process, upon power-on of the main body, if authentication information is registered in the main body, the authentication process including a process to authenticate a user based on authentication information input by the user and the authentication information registered in the main body, and a forced-registration unit which performs a forced-registration process to request the user to register new authentication information and inhibit the main body from operating until the new authentication information is registered, upon power-on of the main body.

5 Claims, 8 Drawing Sheets

FOREIGN PATENT DOCUMENTS

JP 2005-94374 4/2005
JP 2006018451 A * 1/2006

* cited by examiner

INFORMATION PROCESSING APPARATUS AND METHOD OF CONTROLLING AUTHENTICATION PROCESS

CROSS-REFERENCE TO RELATED APPLICATIONS

This application is based upon and claims the benefit of priority from Japanese Patent Application No. 2005-241218, filed Aug. 23, 2005, the entire contents of which are incorporated herein by reference.

BACKGROUND

1. Field

One embodiment of the invention relates to an information processing apparatus such as a personal computer, for example, having a user authentication function.

2. Description of the Related Art

Portable personal computers of various types such as a laptop type and a notebook type have recently been developed. These computers have a user authentication function to prevent unauthorized use of the computers.

As the user authentication function, a basic input output system (BIOS) password function is known. The BIOS password function is a function of performing an authentication process to authenticate a user upon power-on of a computer. All of the operations including a system boot-up process are inhibited unless a BIOS password stored in advance in the computer and a password typed by the user match with each other. The BIOS password function therefore protects the computer against unauthorized use in the event of theft.

Jpn. Pat. Appln. KOKAI Publication No. 2001-27911 discloses a computer with a BIOS password function as described above.

Most computer users do not know the BIOS password function. Since the BIOS password function is important in that the unauthorized use of a computer can be restricted in case the computer is stolen, the system administrator in a company wishes to force each individual user to register a BIOS password. In actuality, however, the registration of a BIOS password depends on each individual user. In other words, the system administrator can simply request each of users to register a password; therefore, it is not expected that all the users will register their individual BIOS passwords.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes a main body, an authentication unit which performs an authentication process, upon power-on of the main body, if authentication information is registered in the main body, the authentication process including a process to authenticate a user based on authentication information input by the user and the authentication information registered in the main body, and a forced-registration unit which performs a forced-registration process to request the user to register new authentication information and inhibit the main body from operating until the new authentication information is registered, upon power-on of the main body.

Figure 1:
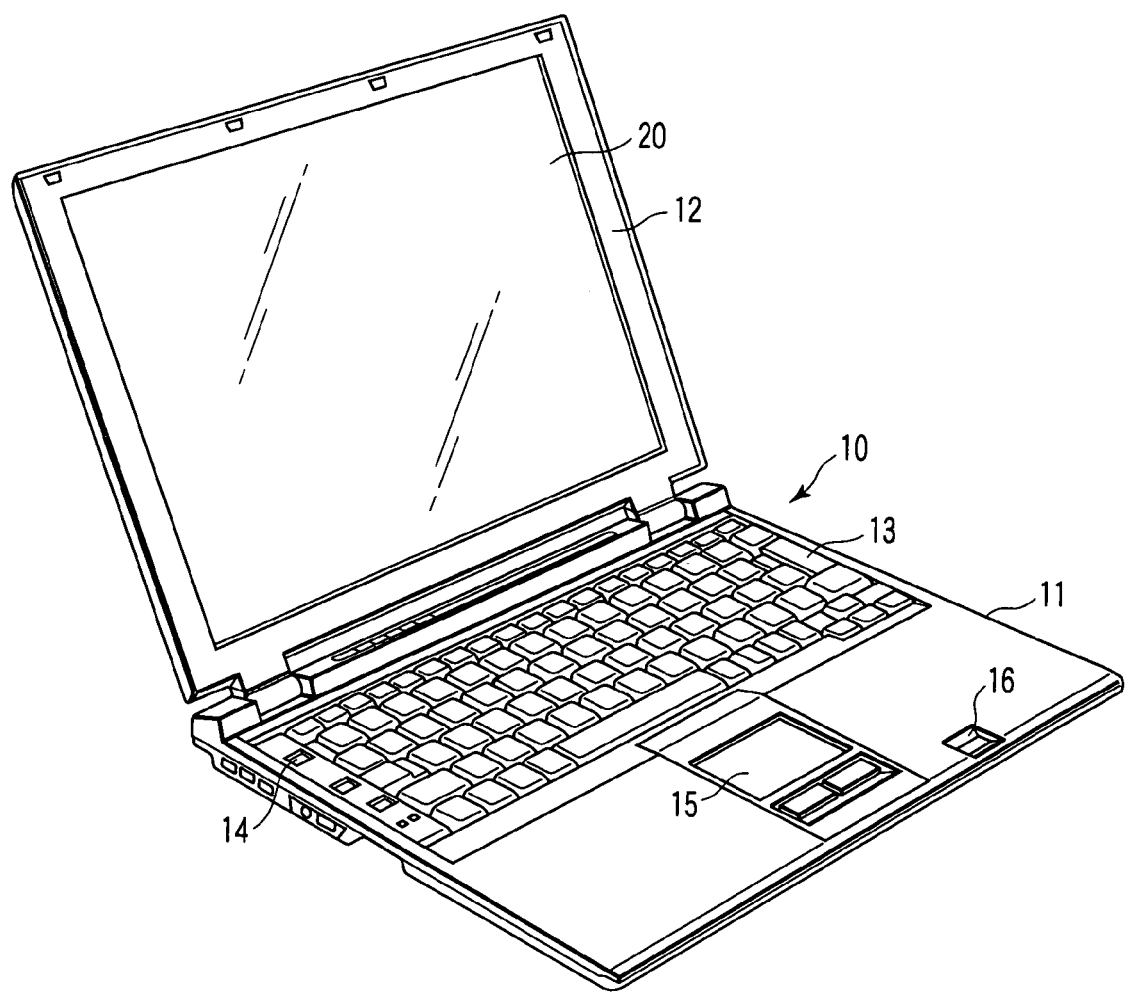
FIG. 1 is an exemplary perspective view of an outward appearance of an information processing apparatus according to an embodiment of the invention.
Figure 2:
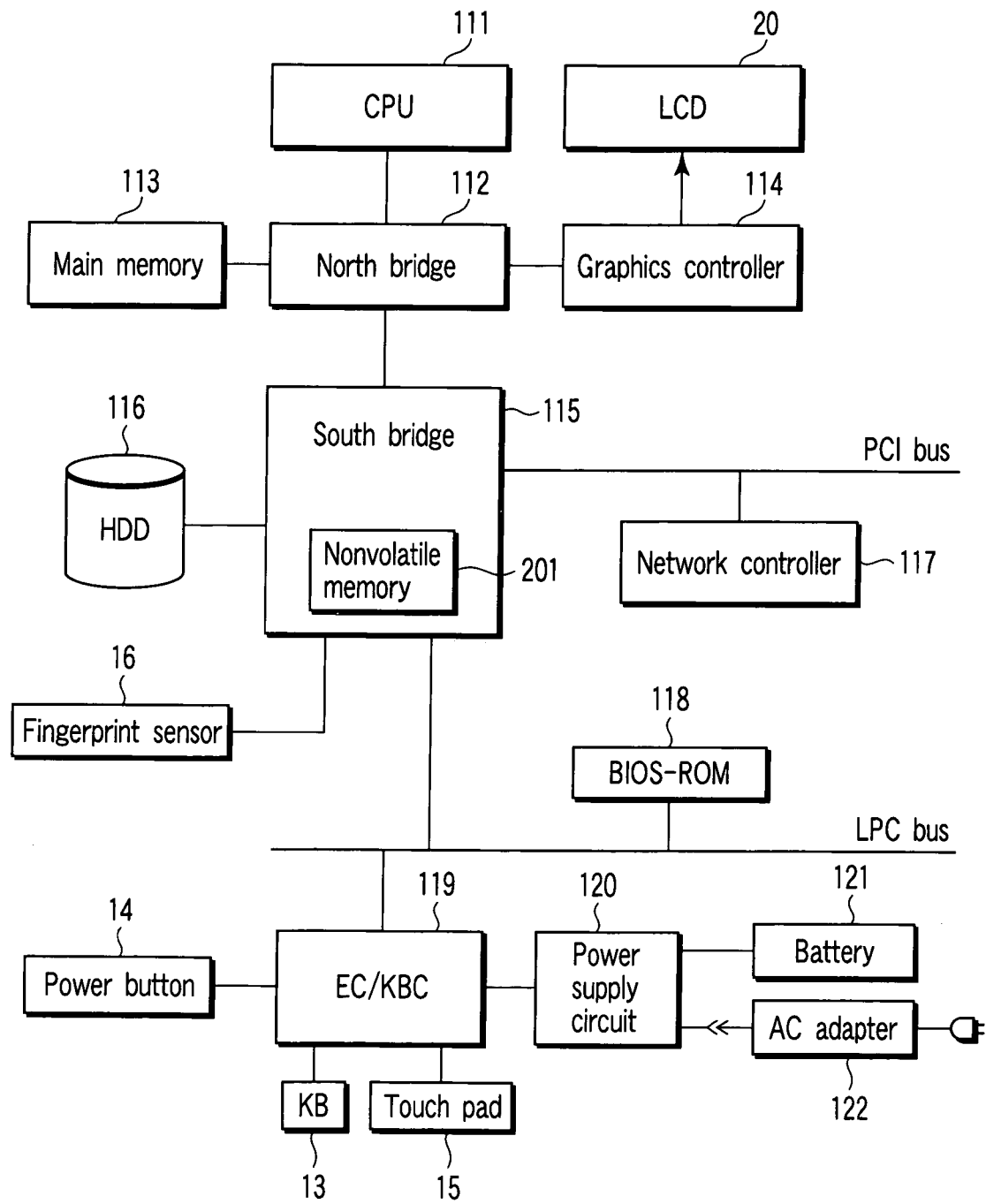
FIG. 2 is an exemplary block diagram of a system configuration of the information processing apparatus shown in FIG. 1.

Referring first to FIGS. 1 and 2, the configuration of an information processing apparatus according to the embodiment will be described. The information processing apparatus is implemented as, for example, a battery-operable, portable notebook personal computer 10.

FIG. 1 is a perspective view of the notebook personal computer 10 whose display unit is open.

The computer 10 includes a main body 11 and a display unit 12. The display unit 12 incorporates a display device that is formed of a liquid crystal display (LCD) 20. The display screen of the LCD 20 is located in almost the central part of the display unit 12.

The display unit 12 is attached to the main body 11 such that it can turn freely between an open position in which the top surface of the main body 11 is exposed and a closed position in which the top surface thereof is covered. The main body 11 has a thin box-shaped housing. A keyboard 13, a power button 14 for powering on/powering off the computer 10, a touch pad 15, and a fingerprint sensor 16 are arranged on the top surface of the main body 11. The fingerprint sensor 16 is used to detect a user's fingerprint.

FIG. 2 shows an example of a system configuration of the computer 10.

The computer 10 includes a CPU 111, a north bridge 112, a main memory 113, a graphics controller 114, a south bridge 115, a hard disk drive (HDD) 116, a network controller 117, a flash BIOS-ROM 118, an embedded controller/keyboard controller IC (EC/KBC) 119, and a power supply circuit 120.

The CPU 111 is a processor for controlling the operation of each of components. The CPU 111 executes an operating system and various application programs/utility programs. The operating system and programs are loaded into the main memory 113 from the HDD 116. The CPU 111 also executes a basic input output system (BIOS) stored in the flash BIOS-ROM 118. The BIOS is a program for controlling hardware.

The north bridge 112 is a bridge device for connecting a local bus of the CPU 111 and the south bridge 116. The north bridge 112 has a function of communicating with the graphics controller 114 via an accelerated graphics port (AGP) bus. The north bridge 112 incorporates a memory controller for controlling the main memory 113.

The graphics controller 114 is a display controller for controlling the LCD 20 that is used as a display monitor of the computer 10. The south bridge 115 is connected to a peripheral component interconnect (PCI) bus and a low pin count (LPC) bus.

The south bridge 115 incorporates a nonvolatile memory 201. The nonvolatile memory 201 is a storage unit for storing setup information indicating the system environment of the computer 10.

The EC/KBC 119 is a one-chip microcomputer on which an embedded controller for managing power and a keyboard controller for controlling the keyboard (KB) 13 and the touch pad 15 are integrated. The EC/KBC 119 powers on/powers off the computer 10 by a user's depression of the power button 14 in association with the power supply circuit 120. The power supply circuit 120 generates system power, which is to be applied to the components of the computer 10, using a battery 121 or an external power that is applied via a battery 121.

Figure 3:
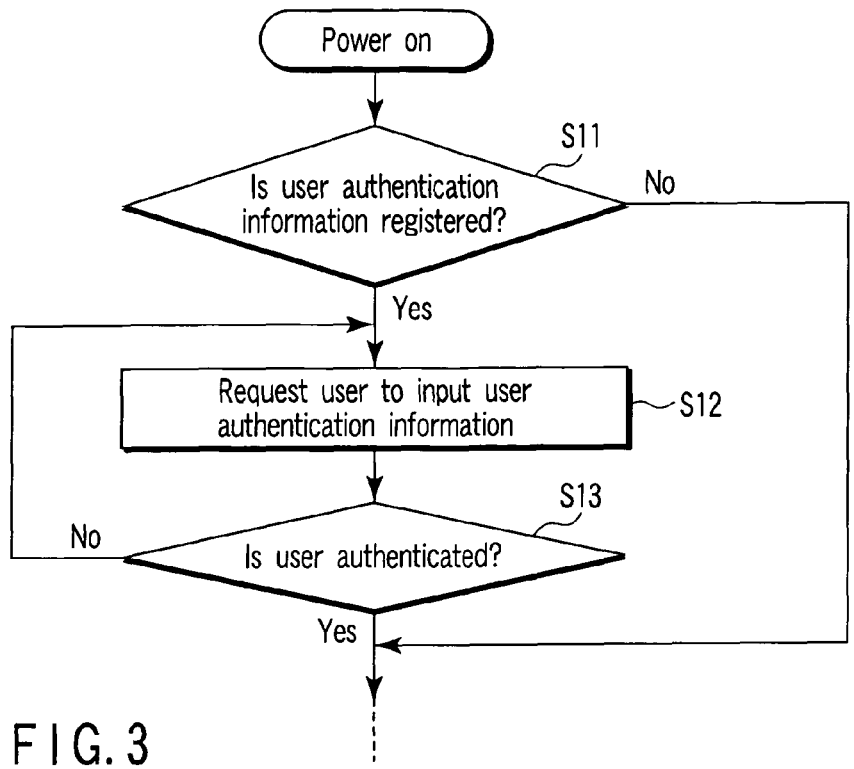
FIG. 3 is an exemplary flowchart illustrating a procedure for a BIOS authentication process performed by the information processing apparatus shown in FIG. 1.

A BIOS authentication process will be described with reference to FIG. 3.

When the computer 10 is powered on, the BIOS is first executed by the CPU 111. The BIOS determines whether user authentication information (user password or biometric information such as a fingerprint) for identifying a user is registered in advance in the computer 10 (block S11).

If the user authentication information is registered (YES in block S11), the BIOS requests the user to input the user authentication information. The user inputs the user authentication information using an input device (keyboard 13 or fingerprint sensor 16). The BIOS compares the user authentication information input by the user with the user authentication information registered in advance to determine whether the user is an authenticated one who can use the computer 10. When the BIOS determines that the user is authenticated, it allows the operating system to perform a boot-up process. The main body 11 is inhibited from operating until the BIOS determines that the user is authenticated. In other words, the BIOS inhibits all of the operations including the boot-up process of the operating system. The BIOS authentication process can thus protect the computer 10 from unauthorized use in the event of theft.

The user password is also referred to as a BIOS password. The user password is registered by a setup function provided by the BIOS or a dedicated utility program. The registered user password is stored in the BIOS-ROM 118, nonvolatile memory 201 or the like. The biometric information such as a fingerprint is also registered by the setup function provided by the BIOS or the dedicated utility program.

The computer 10 also has an HDD password function. The HDD password function is a function of restricting access to the HDD 116 using disk authentication information such as an HDD password. When the disk authentication information is registered in the HDD 116, the HDD 116 is locked and does not accept any commands other than an authentication command. In this case, the BIOS requests the user to input the disk authentication information in response to the power-on of the computer 10 and performs a process of unlocking the HDD 116 using the disk authentication information input by the user.

Figure 4:
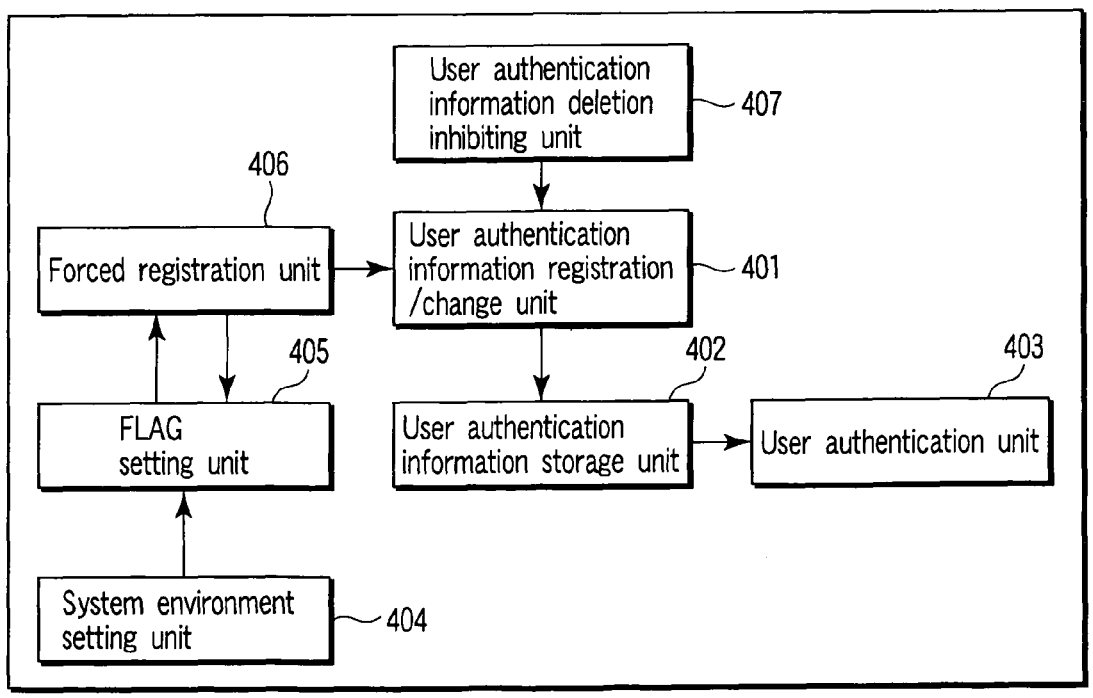
FIG. 4 is an exemplary illustration of a user authentication information forced-registration function provided in the information processing apparatus shown in FIG. 1.

A BIOS authentication function and a user authentication information forced-registration function will be descried with reference to FIG. 4.

The BIOS authentication function is fulfilled by a user authentication information registration/change unit 401, a user authentication information storage unit 402 and a user authentication unit 403.

The authentication information registration/change unit 401 performs a process of registering user authentication information (user password or biometric information such as a fingerprint) or a process of changing the registered user authentication information according to user's operation. The user authentication information registered by the unit 401 is stored in the user authentication storage unit 402. The unit 402 is implemented by the nonvolatile memory 201, BIOS-ROM 118 or the like. If the user authentication information is stored in the unit 402, the user authentication unit 403 performs an authentication process to authenticate the user, on the basis of the registered user authentication information and the input user authentication information, in response to the power-on of the main body 11. The use of the computer 10 is inhibited until the user is authenticated or until the user inputs correct user authentication information.

The user authentication information registration/change unit 401 and user authentication unit 403 are each implemented by a BIOS.

The user authentication information forced-registration function is fulfilled by a system environment setting unit 404, a forced-registration/change flag (FLAG) setting unit 405, a forced registration unit 406 and a user authentication information deletion inhibiting unit 407.

The system environment setting unit 404 is a user interface for setting system environment regarding the authentication process. Only the user having supervisory authority can operate the unit 404. The system environments settable by the unit 404 include items for designating whether to allow the forced-registration function. The unit 404 allows the forced-registration function to be fulfilled according to the operation of a supervisor (a user having supervisory authority).

When the unit 404 allows the forced-registration function to be fulfilled, the forced-registration/change flag (FLAG) setting unit 405 sets a forced-registration/change flag (FLAG), which indicates that the forced-registration function should be fulfilled, in active state (FLAG=ON).

When the main body 11 is powered on, the forced registration unit 406 performs a forced-registration process to request the user to register new user authentication information and inhibit the operation of the main body 11 until the new user authentication information is registered. This forced-registration process is performed only when the unit 404 allows the forced-registration function to be fulfilled.

When the main body 11 is powered on, the forced registration unit 406 determines whether the forced-registration/change flag (FLAG) is set in active state, or whether FLAG is on (FLAG=ON) or not. If the flag (FLAG) is set in active state, the unit 406 performs the forced-registration process. When the new authentication information is registered, the unit 406 resets the flag (FLAG) (FLAG=OFF). The forced-registration process can thus be prevented from being performed each time the main body 11 is powered on.

The user authentication information deletion inhibiting unit 407 inhibits the new user authentication information, which is registered in the user authentication information storage unit 402 by the user under the control of the forced-registration process, from being deleted. In other words, when the unit 404 allows the forced-registration function to be fulfilled, the unit 407 deprives the user of the authority to delete the user authentication information from the unit 402 and thus inhibits the new user authentication information from being deleted from the unit 402.

For example, the system environment setting unit 404 is implemented by a utility program that runs on the operating system, and the forced-registration/change flag (FLAG) setting unit 405, forced registration unit 406 and user authentication information deletion inhibiting unit 407 are each implemented by a BIOS.

Figure 5:
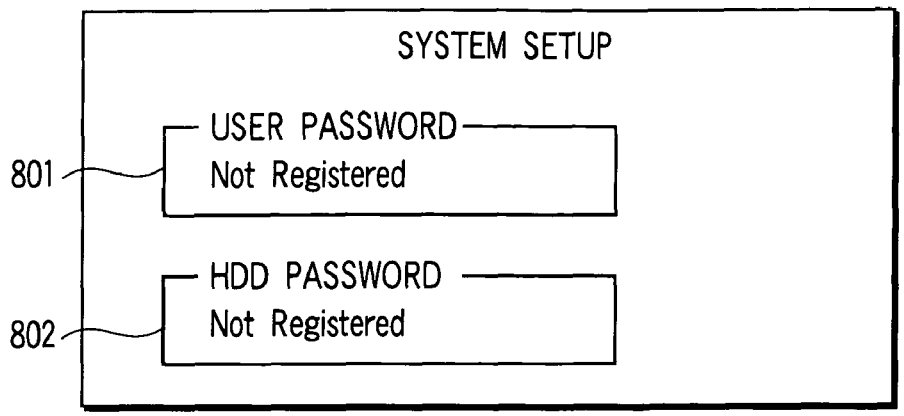
FIG. 5 is an exemplary diagram showing an example of a setup screen used in the information processing apparatus shown in FIG. 1.

FIG. 5 shows an example of a setup screen displayed on the LCD 20 by the BIOS.

On the setup screen, a "USER PASSWORD" field 801 and an "HDD PASSWORD" field 802 are displayed. The user authentication information registration/change unit 401 registers/changes a user password using the setup screen. The user moves a cursor onto the "USER PASSWORD" field 801 and depresses a space key to register, change and delete the user password. Once the unit 404 allows the forced-registration function to be fulfilled, the user password is inhibited from being deleted.

Furthermore, the user moves the cursor to the "HDD PASSWORD" field 802 and depresses the space key to register, change and delete the disk authentication information (HDD password).

Figure 6:
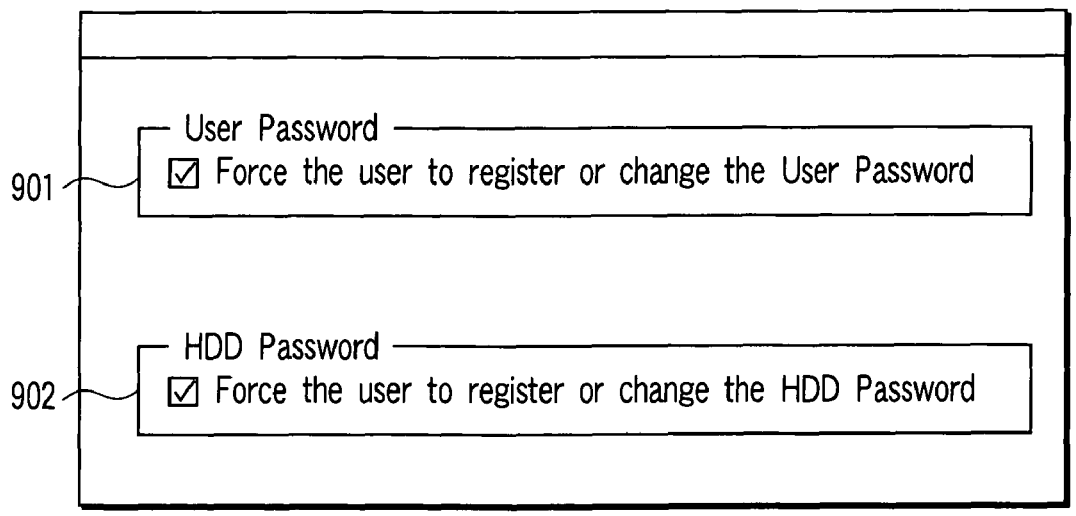
FIG. 6 is an exemplary diagram showing an example of a system environment setting screen used in the information processing apparatus shown in FIG. 1.

FIG. 6 shows an example of a system environment setting screen displayed on the LCD 20 by the system environment setting unit 404.

On the system environment setting screen, a "User Password" field 901 and an "HDD Password" field 902 are displayed. The "User Password" field 901 includes a check box for allowing the forced-registration function of forcing a user to register or change a user password. The supervisor can check the check box to perform the forced-registration function regarding the user password.

The "HDD Password" field 902 includes a check box for allowing the forced-registration function of forcing the user to register or change the HDD password. The supervisor can check the check box to perform the forced-registration function regarding the HDD password.

Figure 7:
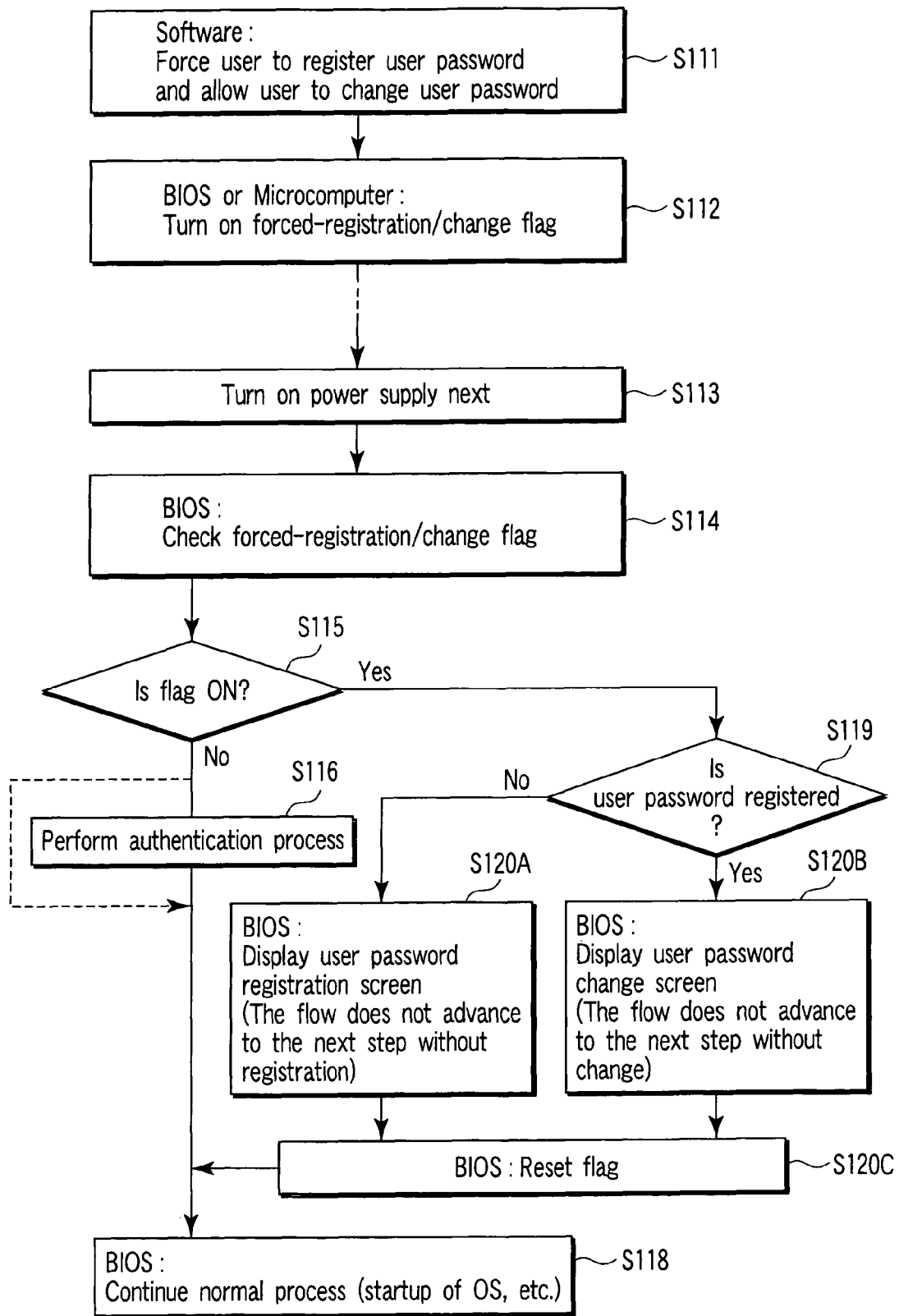
FIG. 7 is an exemplary flowchart of a procedure for performing a user authentication information forced-registration process by the information processing apparatus shown in FIG. 1.

A specific procedure for forcing a user to register/change user authentication information will be described with reference to the flowchart shown in FIG. 7. Assume here that a user password is used as the user authentication information.

The utility program allows the forced-registration function regarding a user password to be fulfilled according to supervisor's operation on the system environment setting screen shown in FIG. 6 (block S111). If the forced-registration function is allowed, the user is deprived of the authority to delete the user password.

The utility program accesses the BIOS or EC/KBC 119 and notifies it that the forced-registration function is allowed to be fulfilled. The BIOS or EC/KBC 119 sets the forced-registration/change flag (FLAG), which is stored in the nonvolatile memory 201 or the like, in active state (block S112).

When the computer 10 is next powered on (block S113), the BIOS checks the forced-registration/change flag (FLAG) and determines whether the flag (FLAG) is set in active state (blocks S114 and S115).

If the flag (FLAG) is not set in active state, or if the flag (FLAG) is OFF (NO in block S115), the BIOS performs a BIOS authentication process (block S116). In the BIOS authentication process, the BIOS first determines whether the user password is registered, or whether the user password is stored in the nonvolatile memory 201. If the user password is not registered, the authentication process is skipped. When the user is authenticated or skips the authentication process, the BIOS carries out a normal process such as a boot of the operating system (block S118).

If the forced-registration/change flag (FLAG) is set in active state, or if the flag (FLAG) is ON (YES in block S115), the BIOS determines whether the user password is registered, or whether the user password is stored in the nonvolatile memory 201 (block S119).

Figure 8:
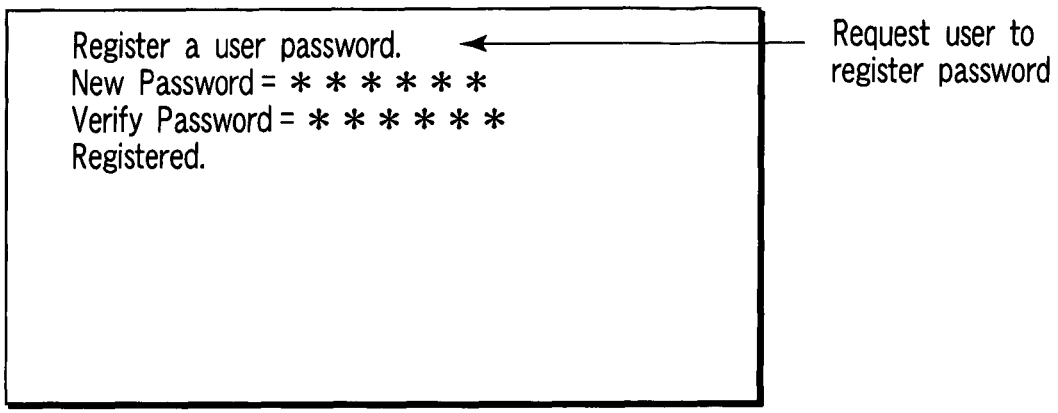
FIG. 8 is an exemplary illustration of an example of a boot-up screen used in the information processing apparatus shown in FIG. 1.

If the user password is not registered (NO in block S119), the BIOS displays a boot-up screen that requires the user to register the user password and inhibits the use of the computer 10 until the user password is registered (block S120A). FIG. 8 shows an example of the boot-up screen that requires the user to register the user password. On the screen shown in FIG. 8, messages "Register a user password" and "New Password=" are displayed first. When the user types a user password and depresses the ENTER key, a message "Verify Password=" is displayed to verify the input user password. If the user retypes the user password correctly and depresses the ENTER key, a message "Registered" is displayed. The process is thus completed.

When the user password is registered, the BIOS resets the forced-registration/change flag (FLAG=OFF) (block S120C) and advances to block S118 described above.

Figure 9:
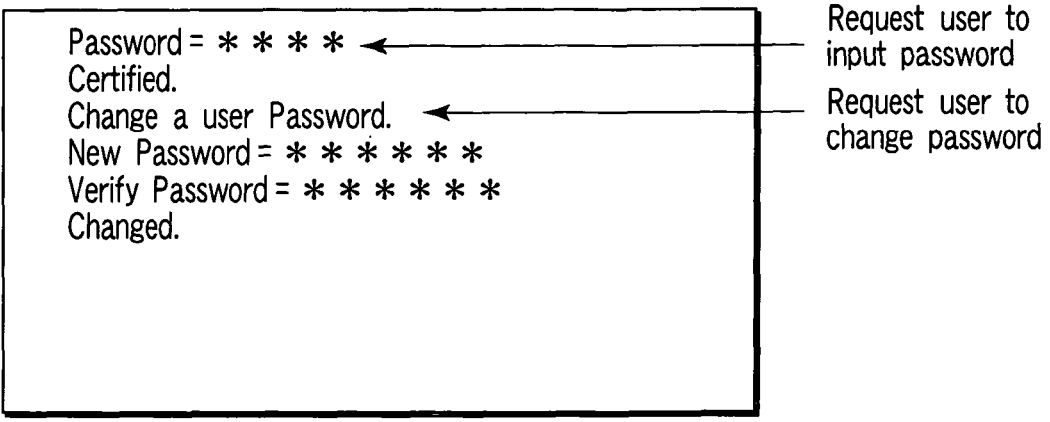
FIG. 9 is an exemplary illustration of another example of the boot-up screen used in the information processing apparatus shown in FIG. 1.

If the user password has already been registered (YES in block S119), the BIOS displays a boot-up screen that requires the user to change the registered user password and inhibits the use of the computer 10 until the user password is changed (block S120B). FIG. 9 shows an example of the boot-up screen that requires the user to change the user password. On the screen shown in FIG. 9, a message "Password=" that requires the user to input a password is displayed first. The user types a user password and depresses the ENTER key. If the typed user password is correct, messages "Certified," "Change a user Password" and "New Password=" are displayed. When the user types a new user password and depresses the ENTER key, a message "Verify Password=" is displayed to verify the input user password. If the user retypes the user password correctly and depresses the ENTER key, a message "Changed" is displayed. The process is thus completed.

When the registered user password is changed to a new user password, the BIOS resets the forced-registration/change flag (FLAG=OFF) (block S120C) and advances to block S118 described above.

In the embodiment of the invention, since a user can be forced to register or change a user password as described above, he or she can be prevented from failing to register the password or failing to change the password for a long time. Consequently, the authentication process can reliably be performed when the computer 10 is powered on, and the computer 10 can be protected from unauthorized use.

The forced-registration of biometric information such as a fingerprint can also be performed by the same procedure as that for the forced-registration of the user password.

Figure 10:
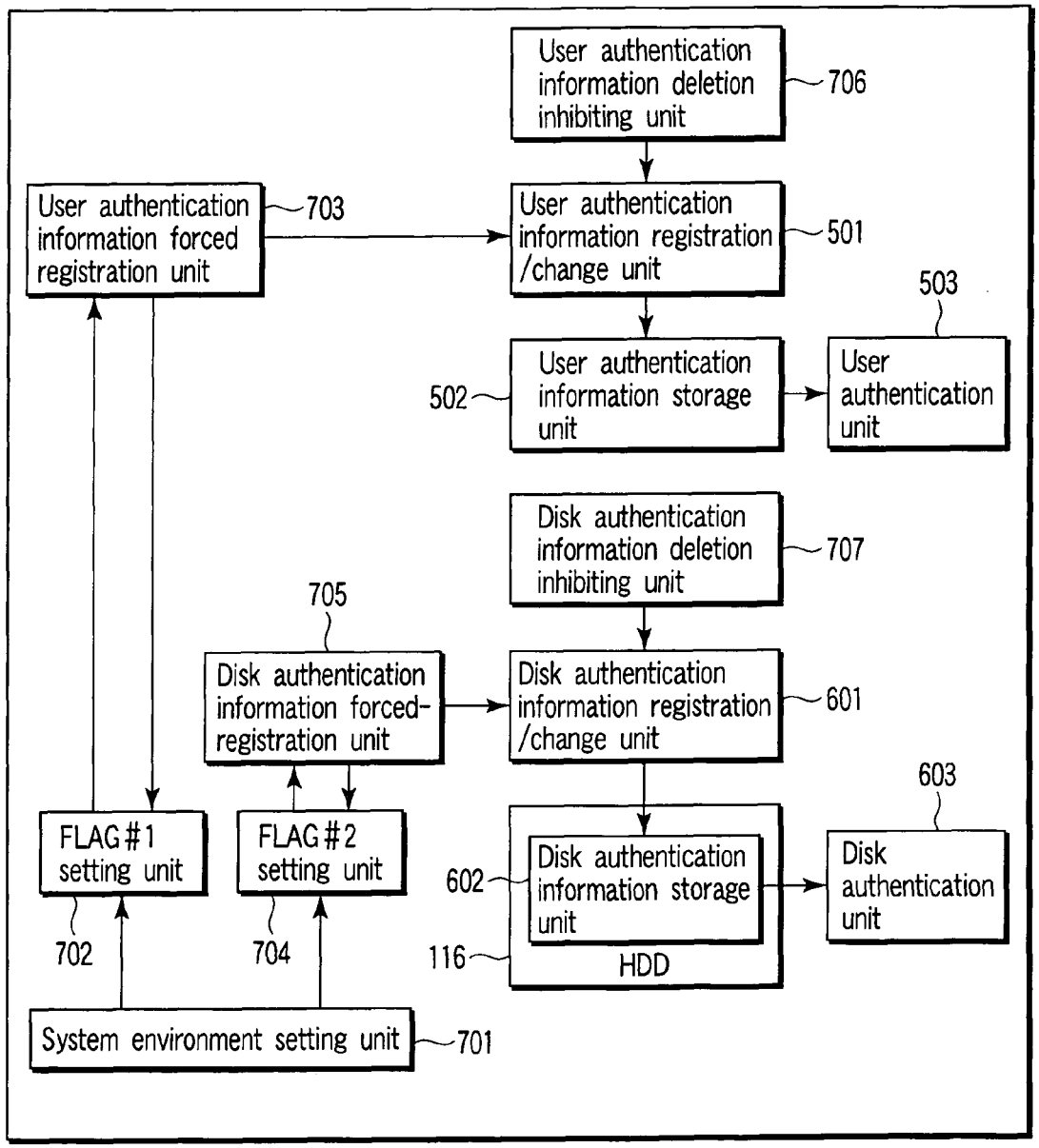
FIG. 10 is an exemplary block diagram illustrating a disk authentication information forced-registration function provided in the information processing apparatus shown in FIG. 1.

FIG. 10 illustrates a configuration for achieving both a forced-registration function regarding user authentication information and a forced-registration function regarding disk authentication information.

A user authentication function is fulfilled by a user authentication information registration/change unit 501, a user authentication information storage unit 502 and a user authentication unit 503. The units 501, 502 and 503 are the same as the units 401, 402 and 403 shown in FIG. 4.

The HDD password function is fulfilled by a disk authentication information registration/change unit 601, a disk authentication information storage unit 602 and a disk authentication unit 603.

The disk authentication information registration/change unit 601 registers disk authentication information (HDD password) or changes the registered disk authentication information according to user's operation. The disk authentication information registered by the unit 601 is stored in the disk authentication information storage unit 602 in the HDD 116. If the disk authentication information is stored in the unit 602, the disk authentication unit 603 requests a user to input the disk authentication information and unlocks the HDD 116 using the input disk authentication information upon power-on of the main body 11. The input disk authentication information is sent to the HDD 116. A controller in the HDD 116 compares the disk authentication information stored in the unit 602 and the input disk authentication information and unlocks the HDD 116 when they match with each other. Access to the HDD 116 is inhibited until the user inputs correct disk authentication information.

The disk authentication information registration/change unit 601 and disk authentication unit 603 are each implemented by a BIOS.

The forced-registration function regarding user authentication information is fulfilled by a system environment setting unit 701, a user authentication information forced-registration/change flag (FLAG #1) setting unit 702, a user authentication information forced registration unit 703 and a user authentication information deletion inhibiting unit 706.

The units 702, 703 and 706 are the same as the units 405, 406 and 407 shown in FIG. 4.

The forced-registration function regarding disk authentication information is fulfilled by the system environment setting unit 701, a disk authentication information forced-registration/change flag (FLAG #2) setting unit 704, a disk authentication information forced-registration unit 705 and a disk authentication information deletion inhibiting unit 707.

The system environment setting unit 701 allows the forced-registration function regarding each of user authentication information and disk authentication information to be fulfilled in accordance with supervisor's operations on the system environment setting screen shown in FIG. 6. When the forced-registration function regarding disk authentication information is allowed, the disk authentication information forced-registration/change flag (FLAG #2) setting unit 704 sets a forced-registration/change flag (FLAG #2), which indicates that the forced-registration function regarding disk authentication information should be fulfilled, in active state (FLAG#2=ON).

When the main body 11 is powered on, the disk authentication information forced-registration unit 705 requests the user to register new disk authentication information and inhibits the operation of the main body 11 until the new disk authentication information is registered. This forced-registration process is performed only when the forced-registration function of disk authentication information is allowed.

When the main body 11 is powered on, the disk authentication information forced-registration unit 705 determines whether the forced-registration/change flag (FLAG #2) is set in active state, or whether the FLAG #2 is on (FLAG #2=ON) or not. When the FLAG #2 is set in active state, the unit 705 forces the user to register disk authentication information. If the user registers new disk authentication information, the unit 705 resets the forced-registration/change flag (FLAG #2=OFF). The forced-registration process can thus be prevented from being performed each time the main body 11 is powered on.

The disk authentication information deletion inhibiting unit 707 inhibits the new disk authentication information, which is registered in the disk authentication information storage unit 602 by the user under the control of the forced-registration process, from being deleted. In other words, when the system environment setting unit 701 allows the disk authentication information forced-registration function to be fulfilled, the unit 707 deprives the user of the authority to delete the disk authentication information from the unit 602 and thus inhibits the new disk authentication information from being deleted from the unit 602.

The disk authentication information forced-registration/change flag (FLAG #2) setting unit 704, disk authentication information forced-registration unit 705 and disk authentication information deletion inhibiting unit 707 are each implemented by a BIOS.

Figure 11:
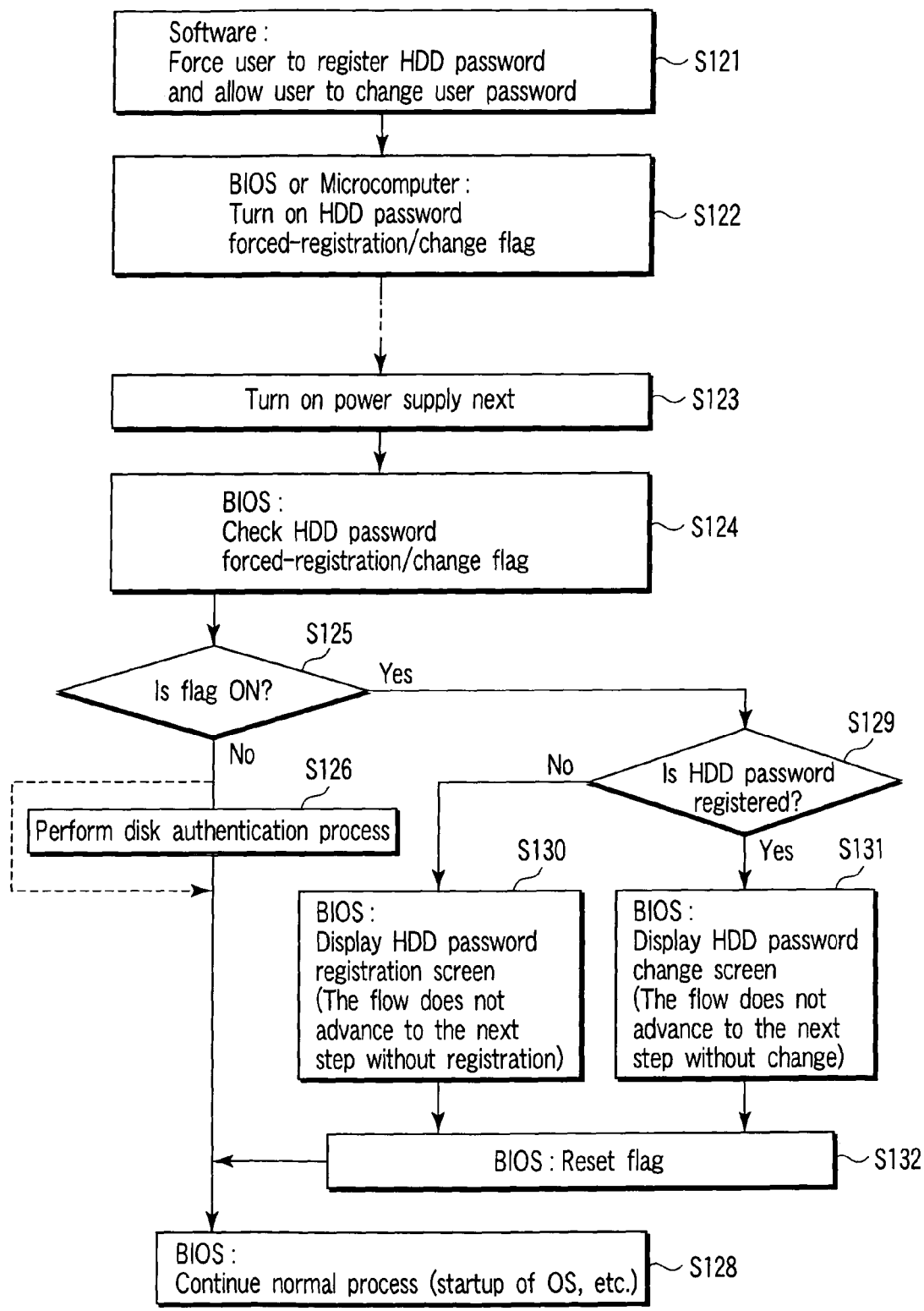
FIG. 11 is an exemplary flowchart of a procedure for performing a disk authentication information forced-registration process by the information processing apparatus shown in FIG. 1.

A procedure for performing a disk authentication information forced-registration/change process will be described with reference to the flowchart shown in FIG. 11.

The utility program allows the forced-registration function regarding an HDD password to be fulfilled according to supervisor's operation on the system environment setting screen shown in FIG. 6 (block S121). If the forced-registration function is allowed, the user is deprived of the authority to delete the HDD password.

The utility program accesses the BIOS or EC/KBC 119 and notifies it that the forced-registration function is allowed to be fulfilled. The BIOS or EC/KBC 119 sets the forced-registration/change flag (FLAG#2), which is stored in the nonvolatile memory 201 or the like, in active state (block S122).

When the computer 10 is next powered on (block S123), the BIOS checks the forced-registration/change flag (FLAG#2) and determines whether the flag (FLAG#2) is set in active state (blocks S124 and S125).

If the flag (FLAG#2) is not set in active state, or if the flag (FLAG#2) is OFF (NO in block S125), the BIOS performs a disk authentication process (block S126). In the disk authentication process, the BIOS first determines whether the HDD password is registered in the HDD 116, or whether the HDD 116 is locked. If the HDD password is not registered, the authentication process is skipped. If the HDD password is registered, the BIOS requests the user to input an HDD password. The HDD password input by the user is sent to the HDD 116 via the BIOS. The HDD 116 compares the input HDD password with the registered HDD password and determines whether the input HDD password is correct or not. If it is correct, or if the user is authenticated, the HDD 116 is unlocked.

When the user is authenticated in the disk authentication, or when the authentication process is skipped, the BIOS carries out a normal process such as a boot of the operating system (block S128).

If the forced-registration/change flag (FLAG#2) is set in active state, or if the flag (FLAG#2) is ON (YES in block S125), the BIOS determines whether the HDD password is registered, or whether the HDD 116 is locked (block S129).

If the HDD password is not registered (NO in block S129), the BIOS displays a boot-up screen that requires the user to register the HDD password and inhibits the use of the computer 10 until the HDD password is registered (block S130). When the HDD password is registered, the BIOS resets the forced-registration/change flag (FLAG#2=OFF) (block S132) and advances to block S128 described above.

If the HDD password has already been registered (YES in block S129), the BIOS displays a boot-up screen that requires the user to change the registered HDD password and inhibits the use of the computer 10 until the HDD password is changed (block S131). When the registered user password is changed to a new HDD password, the BIOS resets the forced-registration/change flag (FLAG=OFF) (block S132) and advances to block S128 described above.

As described above, the HDD password forced-registration process can be performed by the same procedure as that for the user authentication information forced-registration process.

In the present embodiment, when a supervisor allows the forced-registration function to be fulfilled, the forced-registration/change flag is set ON. However, it can be set ON when the computer is shipped from a factory.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a storage unit to store a password for identifying a user;
   a system environment setting module operable by an administrator to control a forced-registration process to be performed, the forced-registration process forcing a user to perform a password registration process of storing a password in the storage unit;
   a setting module configured to set first flag information indicating that the forced-registration process is to be performed in active state, when the forced-registration process is activated by the administrator;
   a forced-registration module configured to:
      determine whether a password is stored in the storage unit upon power-on of the apparatus when the first flag information is set in active state,
      request the user to register a password and inhibit the apparatus from operating until the password is registered when no password is stored in the storage unit,
      request the user to change the password and inhibit the apparatus from operating until the password is changed when the password is stored in the storage unit,
      reset the first flag information when the password is registered or changed; and
      inhibit the registered or changed password from being deleted from the storage unit, after the password is registered or changed; and
   an authentication module configured to:
      determine whether a password is stored in the storage unit upon power-on of the apparatus when the first flag information is not set in active state,
      perform an authentication process to authenticate the user by comparing a password input by the user and the password stored in the storage unit when the password is stored in the storage unit and the first flag information is not set in active state, and
      skip the authentication process when no password is stored in the storage unit and the first flag information is not set in active state.

2. The information processing apparatus according to claim 1, wherein the authentication process is performed by a basic input output system (BIOS) upon power-on of the apparatus.

3. The information processing apparatus according to claim 1, further comprising:
   a disk storage unit provided in the apparatus, wherein the disk storage unit is locked when disk authentication information is stored in the disk storage unit;
   a module configured to allow a disk authentication information forced-registration process to be performed, the disk authentication information forced-registration process forcing a user to perform a disk authentication information registration process of storing disk authentication information in the disk storage unit;
   a module configured to set second flag information indicating that the disk authentication information forced-registration process is to be performed in active state, when the disk authentication information forced-registration process is allowed;
   a disk authentication information forced-registration module configured to:
      determine whether disk authentication information is stored in the disk storage unit upon power-on of the apparatus when the second flag information is set in active state,
      request the user to register disk authentication information and inhibit the apparatus from operating until the disk authentication information is registered when no disk authentication information is stored in the disk storage unit,
      request the user to change the disk authentication information and inhibit the apparatus from operating until the disk authentication information is changed when the disk authentication information is stored in the disk storage unit,
      reset the second flag information when the disk authentication information is registered or changed, and
      inhibit the registered or changed disk authentication information from being deleted from the disk storage unit, after the disk authentication information is registered or changed; and
   a disk authentication module configured to:
      determine whether disk authentication information is stored in the disk storage unit upon power-on of the apparatus when the second flag information is not set in active state,
      perform a disk authentication process when the disk authentication information is stored in the disk storage unit and the second flag information is not set in active state, wherein the disk authentication process is a process to compare a disk password input by the user and the disk authentication information stored in the disk storage unit and release the lock of the disk storage unit if the disk password matches to the disk authentication information stored in the disk storage unit; and
      skip the disk authentication process when no disk authentication information is stored in the disk storage unit and the second flag information is not set in active state.

4. A method of controlling authentication to restrict a user who uses an information processing apparatus, comprising:

performing a system environment setting process by an administrator to control a forced-registration process to be performed, the forced-registration process forcing a user to perform a password registration process of storing a password in the storage unit;

setting first flag information indicating that the forced-registration process is to be performed in active state, when the forced-registration process is activated by the administrator;

determining whether a password is stored in the storage unit upon power-on of the apparatus if the first flag information is set in active state;

requesting the user to register a password and inhibiting the apparatus from operating until the password is registered, if no password is stored in the storage unit;

requesting the user to change the password and inhibiting the apparatus from operating until the password is changed, if the password is stored in the storage unit;

resetting the first flag information if the password is registered or changed;

inhibiting the registered or changed password from being deleted from the storage unit, after the password is registered or changed;

performing an authentication process to authenticate the user upon power-on of the apparatus by comparing a password input by the user and the password stored in the storage unit if the password is stored in the storage unit and the first flag information is not set in active state; and skipping the authentication process if no password is stored in the storage unit and the first flag information is not set in active state.

5. The method according to claim 4, wherein the authentication process is performed by a basic input output system (BIOS) upon power-on of the apparatus.

* * * * *